(12) United States Patent
Ward

(10) Patent No.: US 7,063,449 B2
(45) Date of Patent: Jun. 20, 2006

(54) LIGHT EMITTING DIODE (LED) PICTURE ELEMENT

(75) Inventor: Matthew Ward, San Francisco, CA (US)

(73) Assignee: Element Labs, Inc., Austin, TX (US)

( * ) Notice: Subject to any disclaimer, the term of this patent is extended or adjusted under 35 U.S.C. 154(b) by 148 days.

(21) Appl. No.: 10/608,383

(22) Filed: Jun. 27, 2003

(65) Prior Publication Data

US 2004/0100796 A1    May 27, 2004

Related U.S. Application Data

(60) Provisional application No. 60/460,861, filed on Apr. 7, 2003, provisional application No. 60/428,577, filed on Nov. 22, 2002, provisional application No. 60/428,052, filed on Nov. 21, 2002.

(51) Int. Cl.
*F21V 7/04*    (2006.01)

(52) U.S. Cl. ................ 362/616; 362/561; 345/102

(58) Field of Classification Search ........... 362/26, 362/27, 29, 31, 97, 230, 231, 560, 561, 276, 362/800–806, 551, 552, 295, 555, 559, 576, 362/616; 385/901, 147, 129; 40/541, 546, 40/581; 345/82, 83, 55, 600, 102, 1.3, 1.1, 345/1.2; 340/478, 479; 313/498, 500, 505; 348/383, 750, 759, 798, 801

See application file for complete search history.

(56) References Cited

U.S. PATENT DOCUMENTS

| | | | | |
|---|---|---|---|---|
| 4,720,706 A | * | 1/1988 | Stine | 345/84 |
| 4,734,619 A | * | 3/1988 | Havel | 313/510 |
| 4,868,719 A | * | 9/1989 | Kouchi et al. | 362/545 |
| 5,184,114 A | * | 2/1993 | Brown | 345/83 |
| 5,375,043 A | | 12/1994 | Tokunaga | 362/31 |
| 6,208,073 B1 | | 3/2001 | Wang et al. | 313/500 |
| 6,305,813 B1 | * | 10/2001 | Lekson et al. | 362/31 |
| 6,329,758 B1 | | 12/2001 | Salam | 315/169.2 |
| 6,386,720 B1 | * | 5/2002 | Mochizuki | 362/27 |
| 6,402,354 B1 | | 6/2002 | Tatewaki et al. | 362/490 |
| 6,418,267 B1 | * | 7/2002 | Lowry | 385/147 |
| 6,443,594 B1 | | 9/2002 | Marshall et al. | 362/244 |
| 6,522,066 B1 | * | 2/2003 | Sheu et al. | 313/505 |

(Continued)

OTHER PUBLICATIONS

Peter H. Putman, "when Old s New Again" Video Systems; Mar. 2002; pp: 36-43.

(Continued)

*Primary Examiner*—Ali Alavi
*Assistant Examiner*—Hargobind S. Sawhney
(74) *Attorney, Agent, or Firm*—Fliesler Meyer, LLP

(57) ABSTRACT

A picture element lamp is disclosed that mixes light from LEDs in a light guide. The light guide expands the perceived light source and can redirect the light toward viewing locations.

48 Claims, 10 Drawing Sheets

U.S. PATENT DOCUMENTS

| | | | |
|---|---|---|---|
| 6,539,656 B1 * | 4/2003 | Maas et al. | 40/546 |
| 6,550,953 B1 | 4/2003 | Ichikawa et al. | 362/800 |
| 6,558,021 B1 * | 5/2003 | Wu et al. | 362/249 |
| 6,597,348 B1 * | 7/2003 | Yamazaki et al. | 345/175 |
| 6,623,132 B1 * | 9/2003 | Lekson et al. | 362/31 |
| 6,799,865 B1 * | 10/2004 | Ellens et al. | 362/240 |
| 6,805,468 B1 * | 10/2004 | Itoh et al. | 362/362 |
| 2003/0025442 A1 | 2/2003 | Takeuchi et al. | |
| 2003/0043567 A1 * | 3/2003 | Hoelen et al. | 362/31 |
| 2004/0004827 A1 * | 1/2004 | Guest | 362/31 |

OTHER PUBLICATIONS

Zhao et al., "Optical Elements for Mixing Colored LEDs to Create White Light"; Lighting Research Center, Rensselaer Polytechnic Institute, Troy, NY 12180; 8 pages.

* cited by examiner

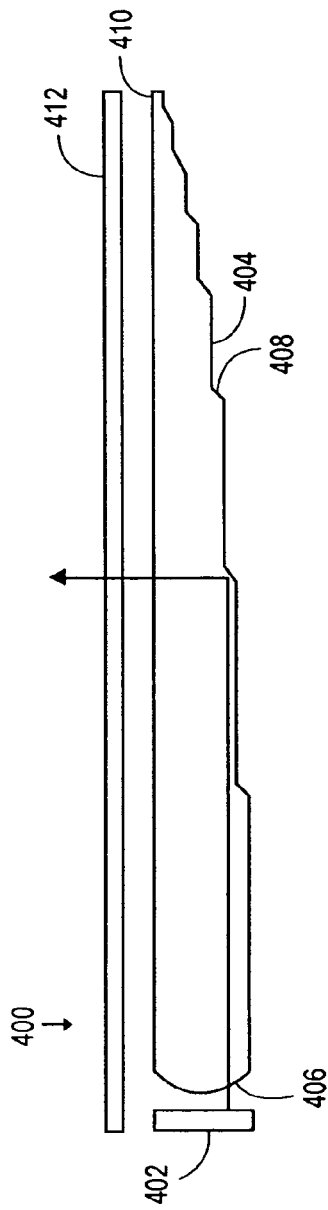
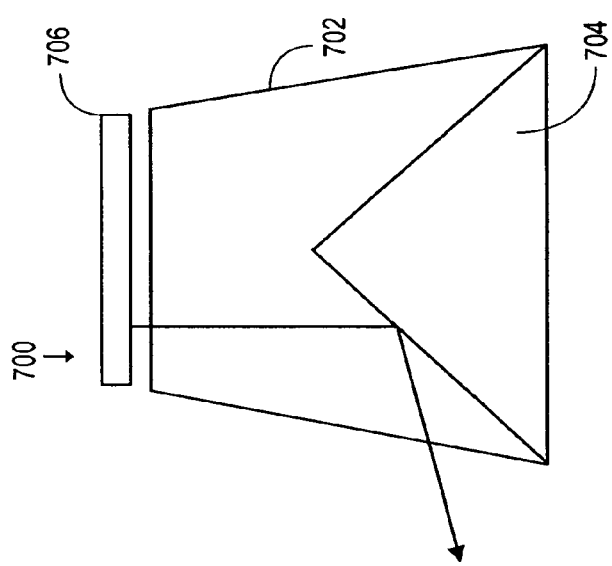

85mm ACRYLIC WAVEGUIDE
ALL UNITS IN mm

US 7,063,449 B2

LIGHT EMITTING DIODE (LED) PICTURE ELEMENT

This application claims priority to the following U.S. Provisional Patent Applications:

U.S. Provisional Patent Application No. 60/428,052, entitled "Method for Creating 360 Degree Viewable Pixels for LED Based Large Screen Video Displays," filed Nov. 21, 2002; U.S. Provisional Patent Application No. 60/428,577, entitled "Thin Self Contained LED Picture Element for Use in Large Format Low Resolution Displays," filed Nov. 22, 2002 and U.S. Provisional Application No. 60/460,861, entitled "Light Emitting Diode (LED) Picture Element," filed Apr. 7, 2003.

FIELD OF INVENTION

The present invention relates to lamps, especially lamps which contain light emitting diodes.

BACKGROUND

Existing video displays which use light emitting diodes (LEDs) are currently highly restricted by viewing distance. The pixels are composed of clusters of red, green and blue LEDs which must be viewed from a significant distance if proper color homogenization is to take place. The use of clusters of LEDs also guarantees that there will be a color shift when the screen is viewed from off center. As a viewer moves away from the center axis and off to one side of the video display the LEDs on that side start to eclipse the LEDs on the opposite side of the screen. Depending on the configuration and number of LEDs this can be a significant problem.

Other problems with the existing video displays are that the screens are anywhere from 8 to 12 inches deep with additional depth required for service. They cannot be easily reconfigured for curved walls or other design driven modifications. They are not designed to accept shelving or signage or relate in any way to any other object in an environment.

Video displays manufactured using clusters of red, green and blue light emitting diodes (LEDs) as pixels can be divided into two categories, Modular Enclosure and Open Frame. Modular Enclosure screens are fabricated in housings or frames which contain the processing, power distribution and cable assemblies required to drive the LED clusters which are either grouped on large printed circuit boards (PCBs) or encapsulated in a single housing. The fronts of these screens are covered with louvers to block sunlight which diminishes the video screens apparent contrast. Open Frame screens are designed to allow some transparency through the use of a slat system or a net system. In a slat system the LED clusters are on long PCBs. In the net system the LED clusters are mounted to a section of netting. None of these screen configurations allows for a pixel to be viewed from 360 degrees.

BRIEF SUMMARY

One embodiment of the present invention comprises of a system consisting of a group of lamps. The lamps including different colored LEDs. The lamps produce light by mixing light of the different colored LEDs. The lamps include a light guide to spread the light over a larger area. The system also includes a control unit adapted to use a video signal to control colors of the lamps.

In one embodiment, the lamps are rectangular. The rectangular lamps can contain light guides which can receive the light from the LEDs from the top and redirect the light toward viewing positions. The light guide can spread the apparent source of the light. In other embodiments, the lamps contain light guides that protrude outside of the base which contains the LEDs. The light from the LEDs goes into the light guide and is reflected outward.

One embodiment of the present invention is a lamp including a LEDs of different colors and a light guide which spreads the light of the LEDs in a larger area. The lamp can glow with different colored lights produced by mixing different colored LEDs.

One embodiment of the present invention is a system including a group of lamps, the lamps including LEDs, the lamps including a light guide to spread the light over a larger area; and a control unit adapted to adjust the intensity of the LEDs in accordance with a video signal.

BRIEF DESCRIPTION OF THE DRAWINGS

FIG. 4 is a cross section of a light of one embodiment of the present invention.

FIG. 7 is a cross section of a lamp containing a light guide that extends from the base.

DETAILED DESCRIPTION

Figure 1:
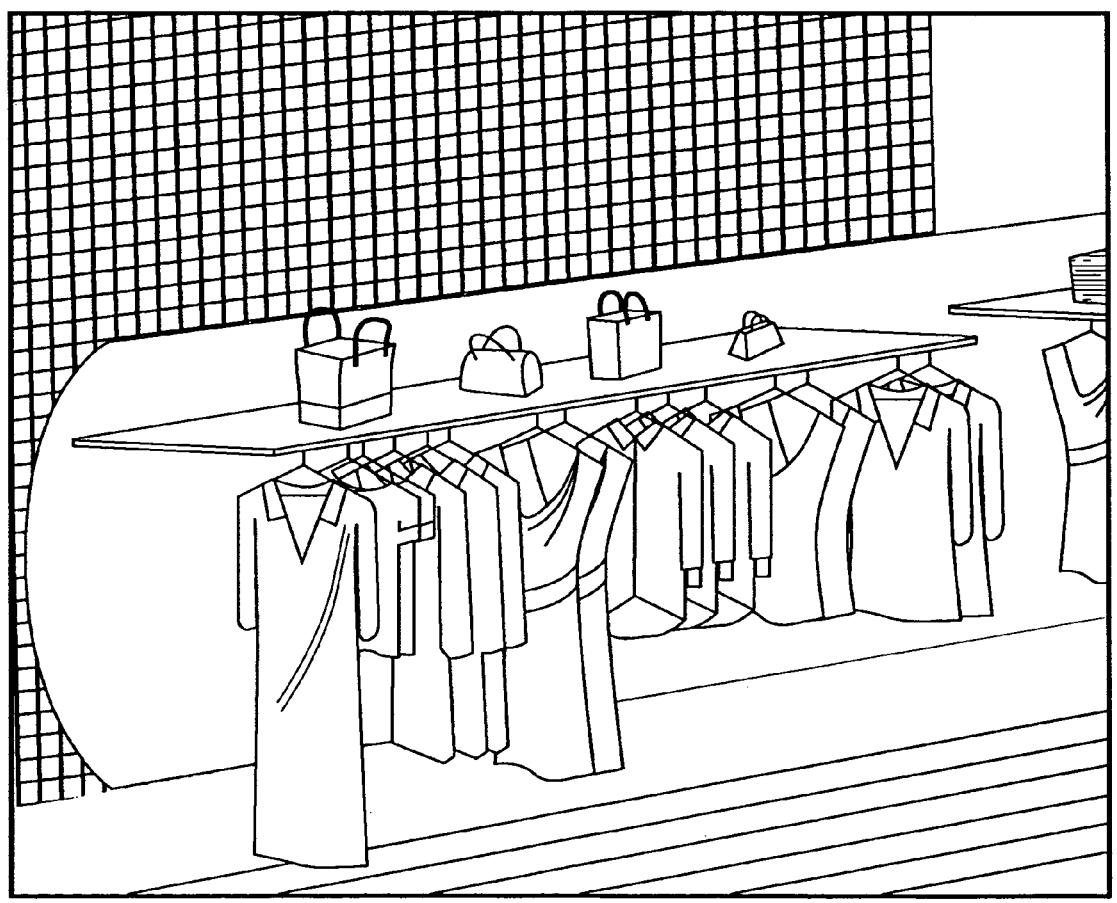
FIG. 1 is a diagram that illustrates a lighting display using the picture element lamps of one embodiment of the present invention.

FIG. 1 illustrates an example of a picture element (pixel) lamp display within a retail environment. The picture element lamps can display information from a video signal. In this example, the picture element lamps mix light from clusters of red, green and blue LEDs. The picture element lamps preferably include a light guide to mix the light from the LEDs. The light guide spreads the perceived origin of the light over a wider area as well as redirects the light to viewer locations.

Figure 2A:
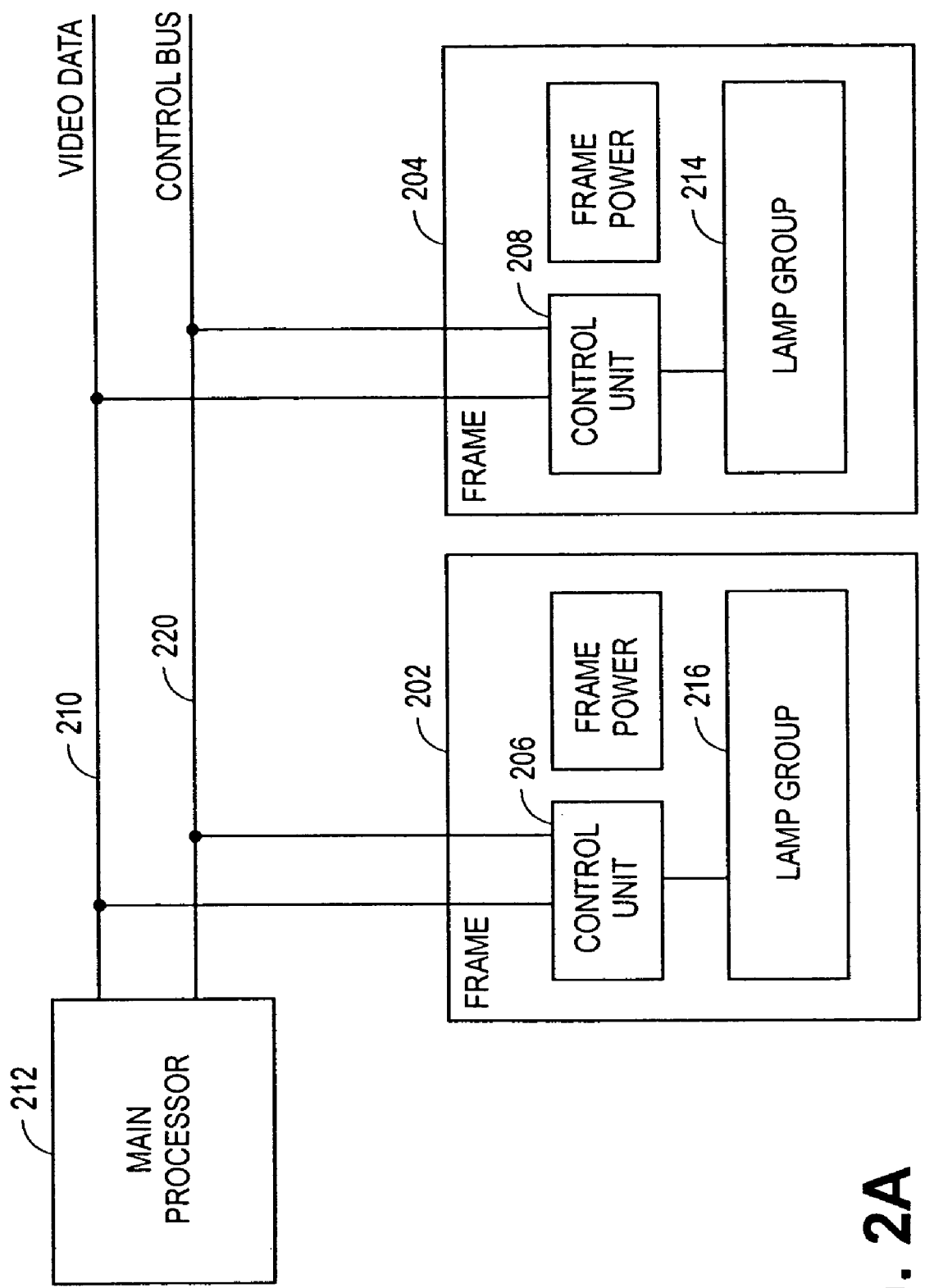
FIG. 2A is a functional diagram illustrating frames containing control units, frame power units and a group of lamps.

FIG. 2A illustrates an example in which frames 202 and 204 are used. Frames can include a control unit, such as control units 206 and 208. The control units can be, for example, a video driver. The control units receive a video signal over the video data bus 210 from a video processor 212. Any type of video signal can be used. The control unit can select a sub-set of the pixels of the video data to drive the LEDs in the lamp groups 214 and 216. The sub-set of pixels can be determined by addresses which are provided across the control bus 220 or in another manner. In one example, the lamp group 212 is an 8×8 grid of lamps. An 8×8 sub-set of pixels within the video signal can be selected to determine color information for the lamps. Data for more than one pixel in the video can be used to produce a single color to be displayed on a picture element lamp within the lamp groups 214 and 216. The control unit can be used to adjust the intensity of the LEDs in accordance with a video signal. A monochrome embodiment can use LEDs of the same color to produce a single color, or "black-and-white", display.

In one embodiment, the color information from the video signal is converted to driving voltages for the LEDs. The LEDs are preferably calibrated so that the same driving voltage produces similar color intensities for the different colored LEDs.

Figure 2B:
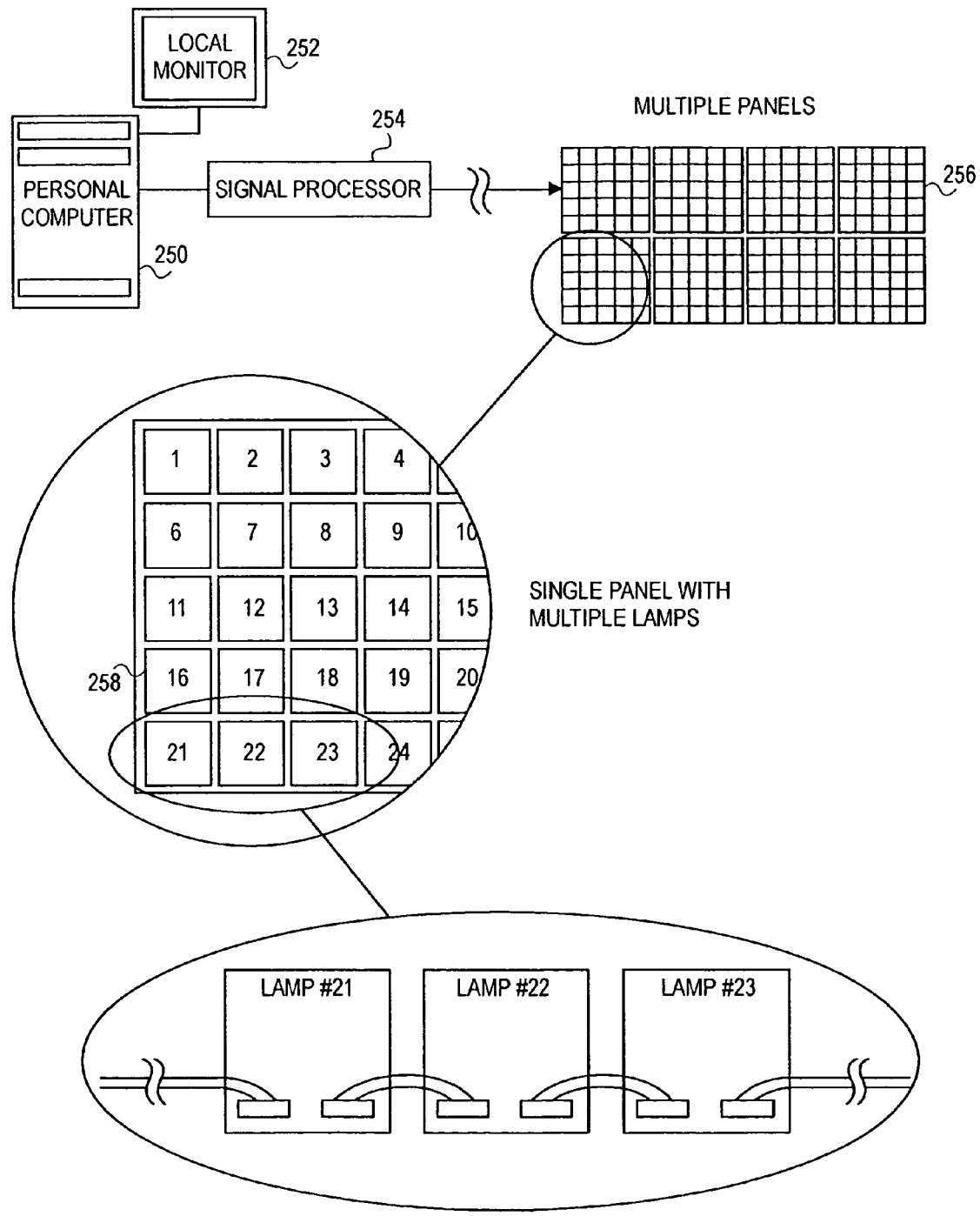
FIG. 2B is a diagram illustrating a system of one embodiment of the present invention.

FIG. 2B is a diagram of one embodiment of the present invention. In this example, a personal computer 250 with local monitor 252 controls a signal processor 254. The signal processor can provide a video signal to multiple panels 256. Each panel is constructed of multiple lamps 258.

Figure 3:
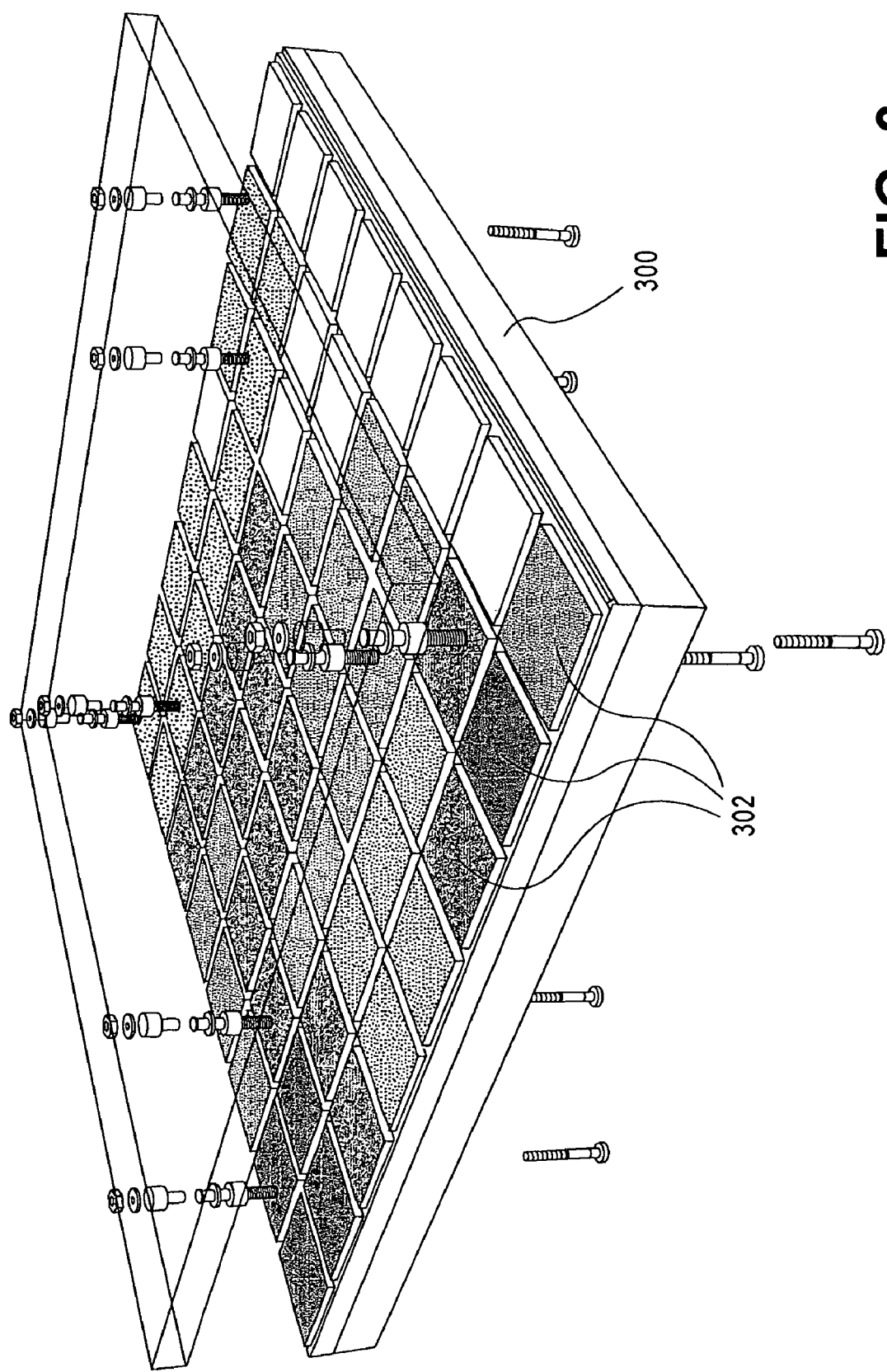
FIG. 3 is a diagram of a cross section of a picture element lamp of one embodiment of the present invention.

FIG. 3 illustrates a frame 300 containing a group of lamps 302. In the example of FIG. 3, the lamps form an 8×8 grid. The lamp grid can be regular or unregular, with or without missing pixels.

Picture element lamps use a light guide to mix colors and spread the light so that the apparent source of light is a relatively wide region such as, the front facing surface of the lamps 302. This makes it comfortable to view the lamp from a few feet away. The low resolution picture element lamps are thus very useful for designers and architects to incorporate into video displays in retail environments.

In one embodiment, the pitch, the distance from the center of one pixel to the center of the next pixel, is no less than 20 millimeters. In a preferred embodiment, the pitch is 40 mm or greater.

In one embodiment, the pixel size of the lamp is about 20 mm or greater in width. Since the picture element lamps are relatively large, the disadvantages of prior art systems is avoided. Such pixels element lamps are significantly larger than what is normally use in video displays. Video displays focus on making the pixels as small as possible and the use of larger pixels is counter-intuitive.

The use of the pixel wall element also addresses a number of criteria, in addition to viewing distance, which influence decisions regarding the use of low resolution video displays. Depth is a critical issue in any design process given the cost of floor space in any building. The wall mounted, picture element can be made relatively thin. The low resolution video display can be adapted to work with a wide variety of design specifications while maintaining a low price point. The low resolution video display can be easily integrated with other interior requirements such as shelving and signage.

In one embodiment, each pixel is packaged as a self-contained lamp for ease of maintenance. A housing conceals the LEDs.

FIG. 4 illustrates a cross section of a picture element lamp of one embodiment of the present invention. The LEDs can be mounted on a printed circuit board (PCB) in a strip 402 at the base of the pixel. A cable assembly can connect from PCB 402 to a control unit (driver board) which converts incoming video information into voltage for the LEDs. Light from the LEDs is directed into a light guide 404. The light guide can be constructed of a plastic, glass or other material. In one embodiment, the light guide 404 has a collimator 406 to collimate light from the LEDs. The light guide 404 can also use facets 408 to reflect the light forward toward viewing positions. The facets 408 preferably use total internal reflection. In one embodiment, the light guide uses diffusion, such as a Fresnel grating, on the front facing surface 410. The back and/or sides of the housing can be treated with or composed of a reflective material. Light from the lamp is directed forward toward an optional cover 412. The cover 412 can be a diffusion plate and/or tinted to improve the contrast of the color.

Figure 5A:
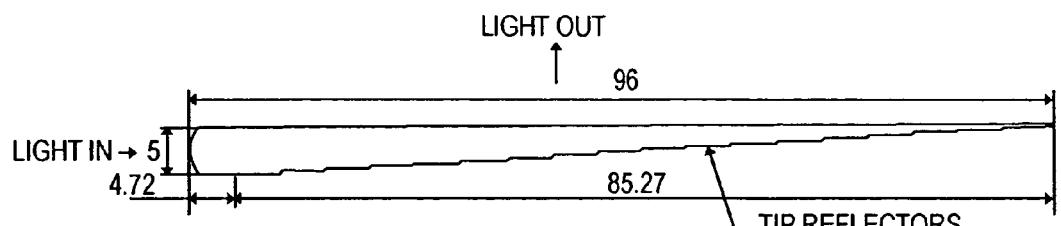
FIGS. 5A and 5B are diagrams illustrating a light guide of one embodiment of the present invention
Figure 5B:
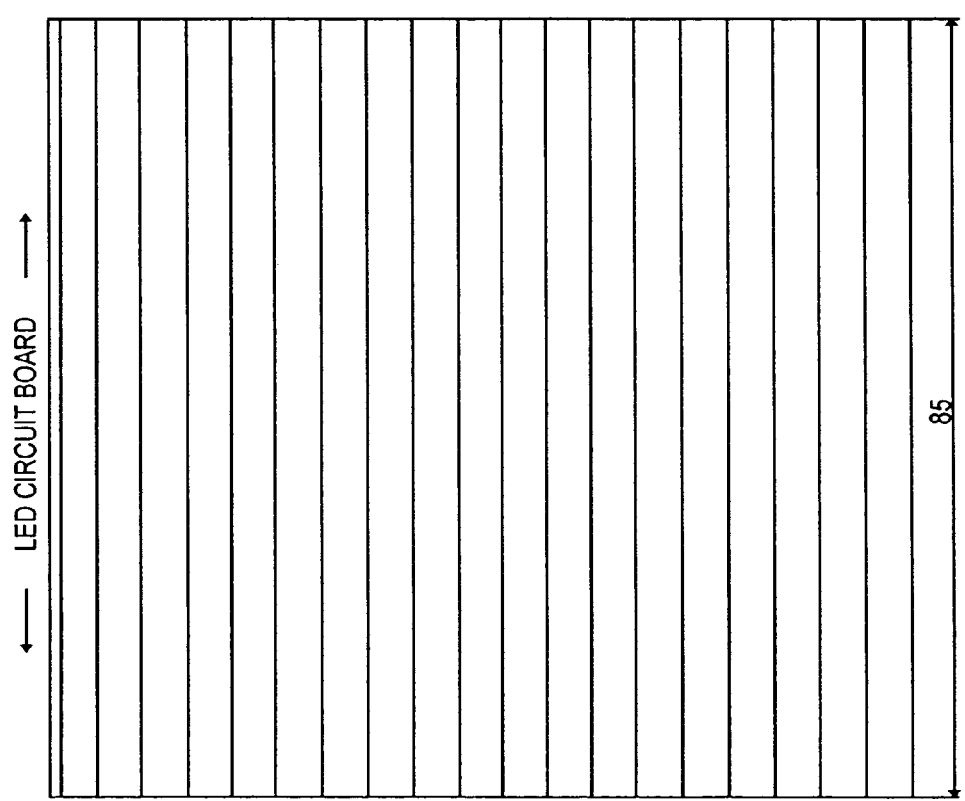

FIGS. 5A and 5B illustrates a side and top view of a light guide of one embodiment of the present invention. In one embodiment, the lamps fit into a frame. The frame can be a plastic frame that is lightweight and easy to manufacture. This plastic frame can also house a power supply and a control unit (video driver board). In one embodiment, the back of the housing features a cleat system which allows the housing to be directly attached to a wall. As shown in FIG. 3, the frame can be curved or have a custom shape enhancing the utility of the pixel lamps. The frame can also have penetrations to allow shelving or other items to be bolted through the low resolution LED display and into a structural system.

Figure 6A:
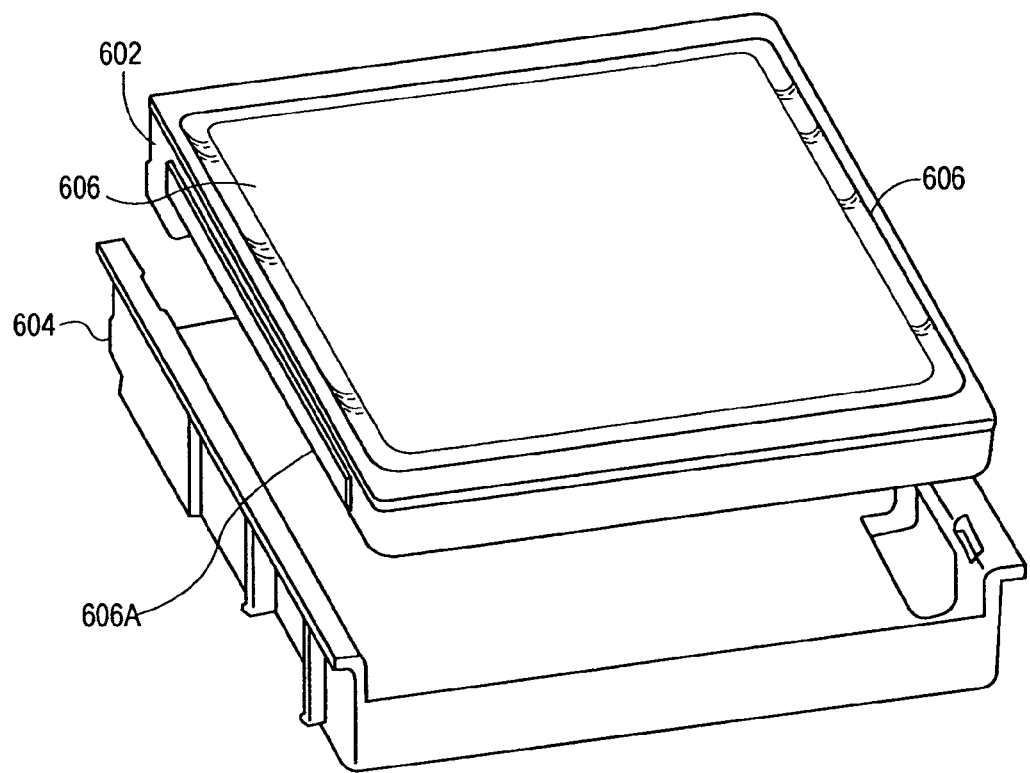
FIGS. 6A and 6B are diagrams that illustrate the snapping of a lamp into a frame of one embodiment of the present of the present invention.
Figure 6B:
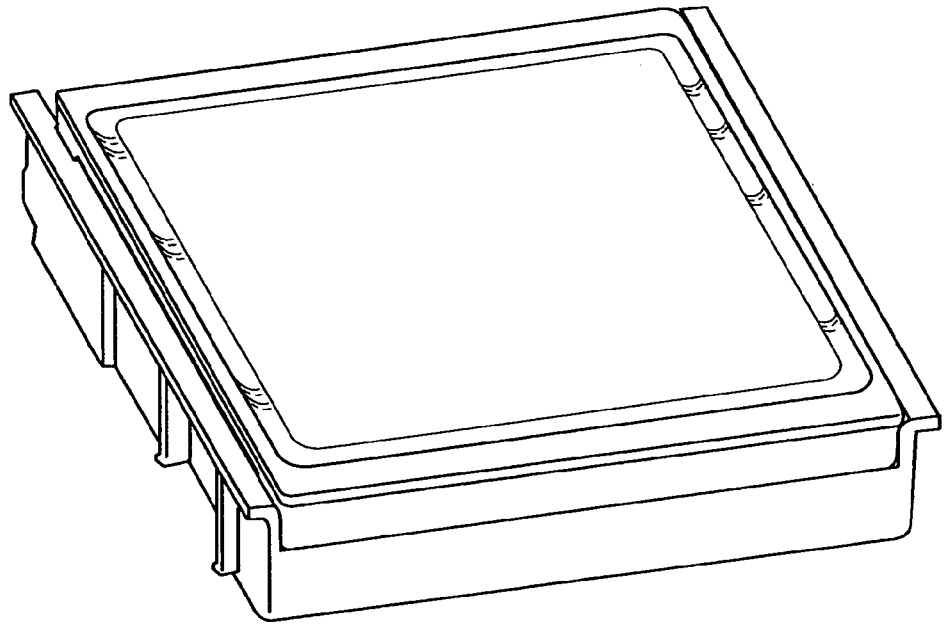

FIGS. 6A and 6B illustrates the connection of the pixel lamp housing 602 to a portion of the frame 604 of the current embodiment. In this example, the lamp 602 includes a cover 604 and housing 606. The housing 606, includes an extension 606a, which engages a portion of the frame 604 to allow the housing to click into the frame.

Surface Mounted LEDs can be used. Surface Mounted LEDs are relatively expensive but allow for a more compact lamp. A separate mixing light guide may be used, with or without a reflector, in order to achieve a more complete homogenization of color. The LEDs may be mounted perpendicular to the light guide. Organic LEDs (OLEDs) may be used to create the pixel lamps. Though-hole LEDs can also be used. The housing may be used as a floor by using the bolt holes to mount a plexiglass front surface which would be supported by structural elements under the housing. The lamps may be removed from the housing and used separately with the same power distribution and video driver. The pixel size is not fixed. Different sized pixel lamps may be used in one system. The driver board may have an adjustment for cable length due to resistive losses in the cables. Different types of materials may be used as light guides. A screen can be fabricated without the tinted plastic front face if contrast is not a priority. Slugs or plastic covers with no electronics can be mixed in with functioning pixels in a grid. Textured front faces or other coverings may be attached or hung in front of the pixels. A coating may be used on the front face to improve contrast. LED clusters at both ends can be used to maximize light output and color mixing a pixel lamp. The pixel lamps can be housed in a transparent plastic or glass sheet. The pixel lamps can be used to edge light shelving or to backlight signage.

The materials for the lamp can be IP 66 or IP 68 approved materials to allow for the external use of the lamps. In one embodiment, the LEDs are grouped on the PCB in clusters of red, green and blue LEDs. The LEDs can preferably be calibrated so that a conventional video driver for LEDs to produce light that can be mixed within the light guide with the lamps of the present invention.

The picture element lamps can use a video signal to provide dynamic lighting effects within a store or other location. The video signal can be a prestored signal from a storage medium, such as a DVD or computer memory. Alternately, the video signal can be from a camera or computer generated.

Another embodiment of the present invention uses a light guide that extends from a base. FIG. 7 illustrates a cross sectional view of a light guide 702 including a cavity 704.

Figure 8A:
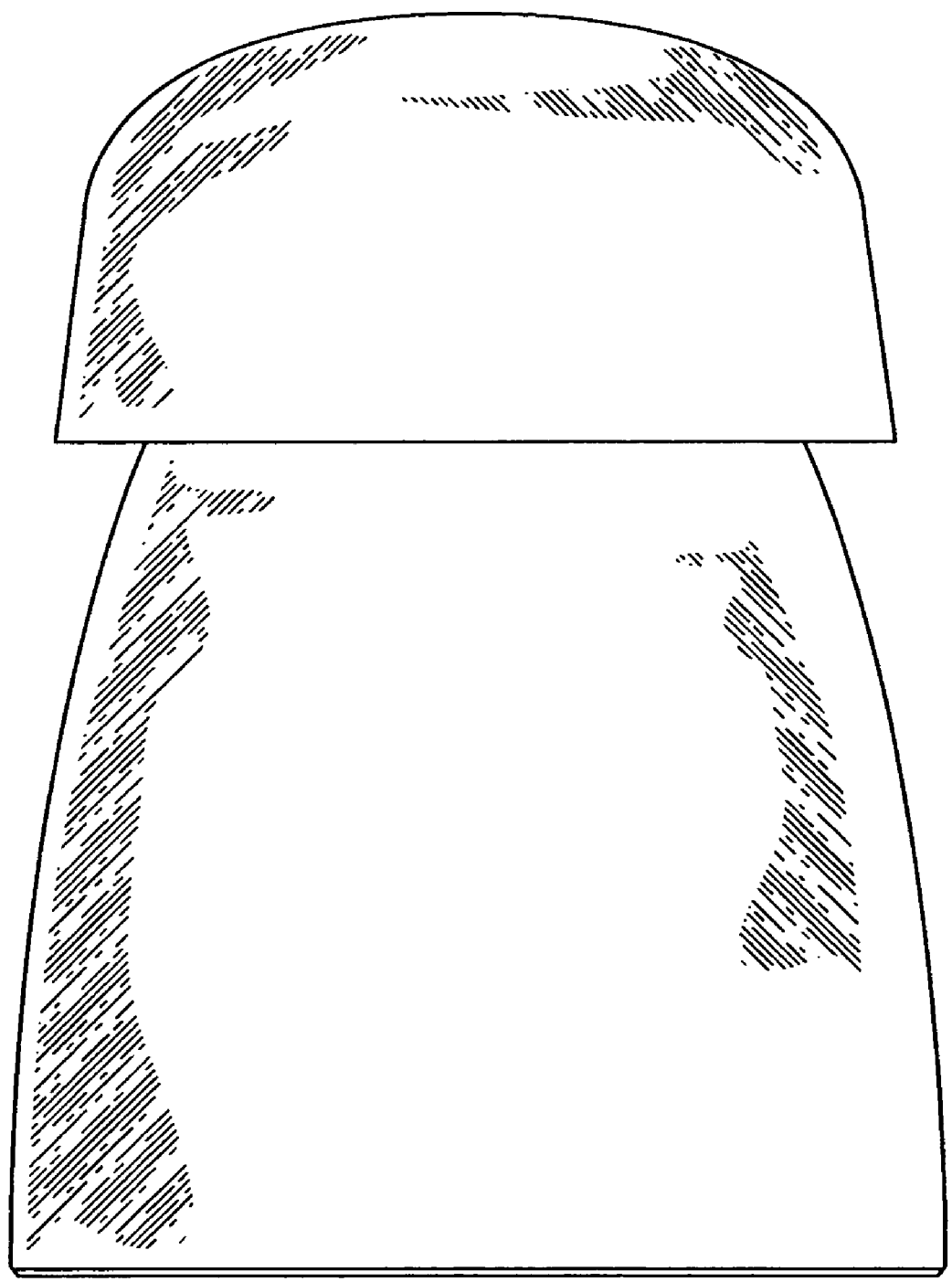
FIGS. 8A and 8B are diagrams that illustrate the lamp of FIG. 7.
Figure 8B:
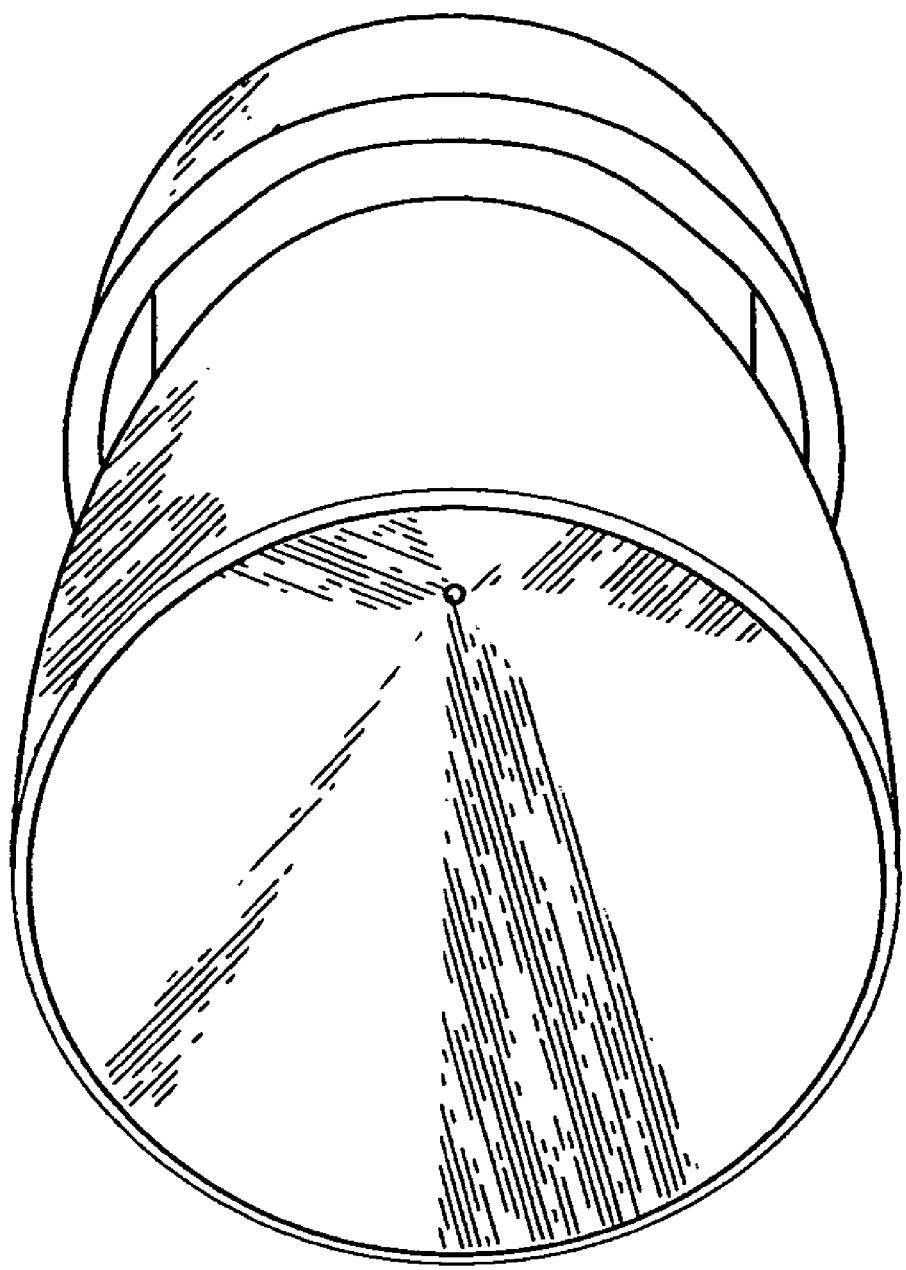

In this example, light guide 702 is bulbed. Light from the LEDs on PCB 706 is sent into the light guide 702. The light guide can include a collimator adjacent to the PCB 706. The light guide 702 can include facets within the cavity. The lamp 700 of FIG. 7 can be arranged into groups. FIGS. 8A and 8B illustrates one example of a light guide for the picture element lamp of FIG. 7. Other possible shapes include globes, cubes, stars, etc.

The light guides can be used to create large video displays in which each picture element can be viewed from 360 degrees vertical orientation and 160 degrees horizontal orientation. The pixel lamps can be placed anywhere with no fixed distance between the lamp and the required video processing.

Existing screens have a fixed relationship in pitch which is a measurement of the distance from a pixel center to the next pixel center. A 10 mm screen fabricated using the Modular Enclosure method will always be a 10 mm screen. The design of the bulbed pixel lamp allows a designer to change pitch in a graduated manner within one screen while the screen is being installed.

The LED cluster may be Surface Mounted Device (SMD). In one embodiment, a basic cluster is composed of at least one red, green and blue LED mounted to a PCB. A cable assembly from the LED cluster to a driver board 6. The cable assembly may or may not be IP 68 rated for outdoor use. A light guide assembly can include a visible element such as a bulb and may also include a neck and/or a collimating lens (not pictured). The parts in this assembly can be selected based on the LEDs being used. Light guides can be composed of optical grade PMMA/Acrylic and other material. A layer of light-scattering diffusion on the outside of the bulb which can be applied as a coating or as a surface treatment. This may also include a UV coating and an anti-reflective coating.

A control unit, such as a driver board, can send line voltages down the cable assembly to the LED cluster. Light from the LED cluster is channeled into the light guide assembly. If it is required by the type of LED used, the light guide will initially be used to mix the colors of the individual red, green and blue LEDs. The light will next pass into the visible part of the light guide, such as the bulb, where it is reflected until it strikes the outside of the bulb can be treated to allow the light in the guide to escape. This makes the light guide glow.

Any number of such pixel lamps may be used in a system. To maximize light output and color mixing a tube could be used with LED clusters at both ends. The light guides can be irregular shapes and heights to create a video topography. Surface Mounted LEDs may require no mixing light guide and a significantly smaller bulb portion. A high intensity white (or other color) LED can shine down from the middle to light space below while the video pixel makes the lamp glow. This in essence becomes a pixel within a pixel.

A coating may be used to improve contrast. Alternate materials may be used for the light guide such as polycarbonate. Any number of LED's may be used as well as different combinations of colors. Applications for a bulb based pixel lamps include a video ceiling, a video dividing wall, a video curtain for a performance in the round and a window decoration in an atrium. The screen can also be used in conjunction with a number of hard and soft translucent coverings.

One embodiment of the present invention uses a group of relatively large pixel lamps. In one embodiment, at least some of the lamps being greater than or equal to 20 mm in pixel size. At least one LED can be used to produce light of different colors. A control unit is adapted to set the color of the lamps in accordance with a video signal.

The lamps can be constructed using a light guide as described above. The light guide can spread the light over a wider area. Light from different colored LEDs is mixed in the light guide.

Alternately, an embodiment without a light guide can be used. Large-sized LEDs can be used. In one embodiment, groups of LEDs or clusters of LEDs driven with the same signal can be used. The LED(s), LED groups or LED clusters can be positioned on the outside of the lamp. In this way a pixel size of greater than 20 mm can be created.

Organic LEDS (OLEDs) and polymer LEDs (PLEDs) can be used. OLEDs and PLEDs are especially useful for the embodiment without a light guide.

In addition to retail environments, the embodiments of the present invention are useful for many other applications including concert touring, TV production, other architectural environments, clubs, theme parks, corporate events, etc. In one embodiment users can use the lamps to form scenic elements.

There are many uses for the lamps in furniture for use as table tops, Chinese/Japanese folding screens, counter tops, headboard for beds, and shelving. The lamps can be a substitute for traditional ceramic/mosaic tiles for example in showers, etc.

The lamps can be used as floor panels and ceiling tiles. The lamps can cover the outside of a building or be used to produce doors. The lamps can also be used in traffic lights and other info display signs. The use of the lamps of the present invention may require fewer LED's and be more compact than current traffic lights systems. The light guide can be curved or an irregular shape (octagon, mosaic tile, etc). The light guide can be an entire object: such as a chair, table top, body panel on a car.

The frames used can be constructed of a flexible material, such as rubber. This can allow the frames to be connected to a curved wall for example. The frames can be hinged.

The lamps can be light from the edge to allow the lamps to be placed with little or no gap between the tiles. The tiles can have beveled edges allowing the LEDs to shine in at an angle from behind. Mirrors, prisms, or other optical devices can be used to reflect the light. This may make the system slightly deeper, but it can eliminate/minimize the frame around each pixel.

In one embodiment, the light guide is mostly transparent when the LEDs are turned off and suitable for use as a window. When turned on, the light guide glows with color.

In one embodiment, a large diffuser which covers multiple lamps is positioned in front of the lamps to make a seamless image. The diffuser can be positioned some distance from the lamps.

In one embodiment, the circuit board and a light guide are placed in a metal frame and no assembly holds the two together before placing them in the frame. The frame and the light guides can be a single piece of molded acrylic or polycarbonate. The circuit boards containing the LEDs can be slotted in place in this block.

In one embodiment, the light guide can include active and non-active areas. The non-active area will not glow as significantly as the active area. An active area of the light guide ca be a distance from the LED source in a larger sheet of acrylic instead of starting right by the LED sources.

A light guide can have variable density of reflecting material. One use of a variable density of reflecting material is to help maintain an even light output as light intensity falls off from the source. A gradient pattern can keep the apparent intensity constant.

Figure 9:
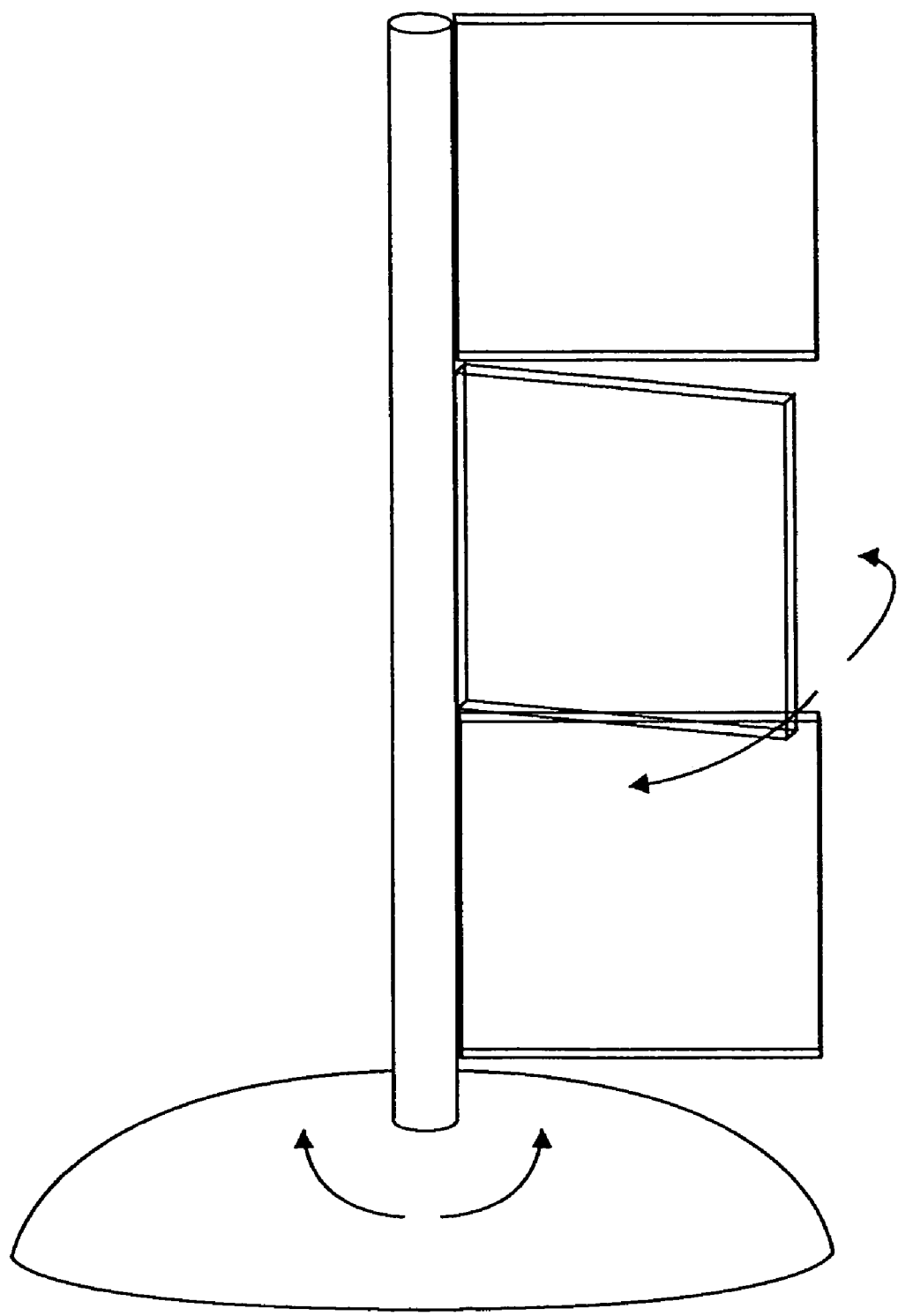
FIG. 9 is a diagram of a flag-based embodiment.

In one embodiment, a wall can be made of vertical rods where the light guides radiate from the rods in a fixed or variable manner. The rods themselves can also move. FIG. 9 illustrates one example of such an embodiment.

In one embodiment, a lamp is a laminated piece of plastic/glass where the LEDs and the light guides are contained in a sandwich. All of the elements can be transparent.

Silk screening can be used to create different shapes and patterns on the lamps. Reflective materials behind the light guide can be used to show different images when the light is off.

The lamps can be a single or dual color version. A single color version can effectively produces a black-and-white display. Information for a single or dual color version can be derived from a video signal.

The lamps can be wirelessly connected to control elements using a wireless connection such as WiFi, Bluetooth, etc.

The lamps can be linked to a trigger, such as a doorbell. The lamps can use music to set the light functionality. For example, an audio signal can be used to produce a video signal that drives the lamps. The lamps can be linked to a clock to shine different colors at different times in the day. The lamps can have a touch sensitive surface that activates the lights. Interactive feedback can be used to trigger the lights from sensors to detect, weight, sound, heat/motion, and/or ambient light levels.

In one embodiment a video output on the last lamp in a sequence is used to help verify remotely that the system is working.

In one embodiment, a laminated panel is used where the LEDs and the light guides are contained within a sandwich of transparent panels. The transparent panels could be acrylic, polycarbonate of glass or any other optically appropriate material.

In one embodiment, dichromic or other red, green and blue filters are used with white LED light sources to create a source of illumination for the light guide.

The foregoing description of preferred embodiments of the present invention has been provided for the purposes of illustration and description, it is not intended to be exhaustive or to limit the invention to the precise forms disclosed. Many modifications and variations will be apparent to one of ordinary skill in the relevant arts. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalence.

The invention claimed is:

1. A display system comprising:
   a group of lamps, each lamp including different colored LEDs so that the lamps can glow with different color light produced by mixing light of different colored LEDs, each lamp including an edge-lit light guide using substantially total internal reflection to spread the light over a larger area; and
   a control unit that drives the colors of the lamps in accordance with a video signal.

2. The system of claim 1, wherein the lamps include a lamp housing.

3. The system of claim 1, wherein the LEDs are positioned on a circuit board.

4. The system of claim 1, wherein the group of lamps is a grid of lamps.

5. The system of claim 4, wherein the pitch between lamps is 20 mm or greater.

6. The system of claim 1, wherein the lamp includes a diffuser plate.

7. The system of claim 6, wherein the diffuser plate increases the contrast of the color.

8. The system of claim 1, wherein light from the LEDs goes into one end of the light guide and comes out the front of the light guide.

9. The system of claim 1, wherein the light guide includes a collimator.

10. The system of claim 1, wherein the light guide includes facets for reflecting light forward.

11. The system of claim 1, wherein the light guide is rectangular.

12. The system of claim 1, wherein the light guide extends out from a base.

13. The system of claim 1, wherein the light guide forms a bulb.

14. The system of claim 13, wherein the bulb includes a center cavity.

15. The system of claim 1, further comprising a frame to hold the group of lamps.

16. The system of claim 15, further comprising an additional frame containing another group of lamps.

17. The system of claim 1, further comprising a video processor adapted to provide the video signal to the control unit.

18. The system of claim 1, wherein the control unit uses a subset of the pixels in the video signal.

19. The system of claim 18, wherein the subset is determined by address information.

20. A display system comprising:
    a group of lamps, at least some of the lamps being greater than or equal to 20 mm in pixel size and using at least one LED to produce light of different colors, the lamps including an edge-lit light guide using substantially total internal reflection; and
    a control unit that sets the color of the lamps in accordance with a video signal.

21. The system of claim 20, wherein the lamps include a light guide to spread the light over a wider area.

22. The system of claim 21, wherein light from different colored LEDs is mixed in the light guide.

23. The system of claim 20, wherein the group of lamps is a grid of lamps.

24. The system of claim 20, wherein multiple LEDs or LED clusters on a lamp are driven with the same signal to create a single pixel lamp.

25. The system of claim 20, wherein the LED is an organic LED.

26. The system of claim 20, wherein the LED is an polymer LED.

27. A display system comprising:
    a group of lamps, each lamps including LEDs an edge-lit light guide substantially total internal using reflections to spread the light over a larger area; and
    a control unit that adjusts the intensity of the LEDs in accordance with a video signal.

28. The system of claim 27 wherein the lamp has multiple colored LEDs and the control unit is adapted to drive the colors of the lamps in accordance with the video signal.

29. The system of claim 27, wherein the lamps include a lamp housing.

30. The system of claim 27, wherein the LEDs are positioned on a circuit board.

31. The system of claim 27, wherein the group of lamps is a grid of lamps.

32. The system of claim 31, wherein the pitch between lamps is 20 mm or greater.

33. The system of claim 27, wherein the lamp includes a diffuser plate.

34. The system of claim 33, wherein the diffuser plate increases the contrast of the color.

35. The system of claim 27, wherein light from the LEDs goes into one end of the light guide and comes out the front of the light guide.

36. The system of claim 27, wherein the light guide includes a collimator.

37. The system of claim 27, wherein the light guide includes facets for reflecting light forward.

38. The system of claim 27, wherein the light guide is rectangular.

39. The system of claim 27, wherein the light guide extends out from a base.

40. The system of claim 27, wherein the light guide forms a bulb.

41. The system of claim 40, wherein the bulb includes a center cavity.

42. The system of claim 27, further comprising a frame to hold the group of lamps.

43. The system of claim 42, further comprising an additional frame containing another group of lamps.

44. The system of claim 27, further comprising a video processor adapted to provide the video signal to the control unit.

45. The system of claim 27, wherein the control unit uses a subset of the pixels in the video signal.

46. The system of claim 45, wherein the subset is determined by address information.

47. A display system including:
a frame;
a number of edge-lit tiles in the frame, each edge-lit tile having different colored LEDs mounted to a side end surface of the tile, the tile using substantially total internal reflection to mix the light from the different colored LEDs and glow from a second surface that is not opposite to the first surface; and
a control unit that uses a video signal to cause each of the lamps to glow with a color as determined by the video signal.

48. A display system comprising:
a number of picture elements, each picture element including edge-lit light guide, each edge-lit picture elements with different colored LEDs mounted to a side end surface, the light guide using substantially total internal reflection to mix the light from the different colored LEDs and distribute the light in a 360 degree pattern; and
a control unit that uses a video signal to cause each of the picture elements to glow with a color as determined by the video signal.

* * * * *